UNITED STATES PATENT OFFICE 2,279,203

ICE CREAM MIXTURE

Albert Musher, New York, N. Y., assignor to Musher Corporation, New York, N. Y., a corporation of New Jersey No Drawing. Application October 12, 1940, Serial No. 360,916

5 Claims. (Cl. 99—137)

The present invention is directed to a frozen confection mixture and it is particularly directed to an ice cream mixture.

In the preparation of ice cream it is desirable that the ice cream, for many purposes, should have a true butter flavor. This is not possible even with ice cream of a high butterfat content in view of the fact that the butterfat is present as the disperse phase of an oil-in-water emulsion.

Also, when crisp corn flakes, for example, are introduced into an ice cream mixture they tend to become soggy and disintegrated and to lose their crispness and attractive edible quality. The crisp quality of corn flakes is a desirable ingredient in ice cream mixtures so as to produce a new desirable crunchiness, and so as to decrease the soft or mushy sensation when the ice cream is eaten.

It is therefore among the objects of the present invention to provide an improved ice cream which will have a true butter flavor, in the form of pure butter, without any of the disagreeable qualities that would come from merely having small lumps of butter interspersed within the ice cream.

It is further among the objects of the present invention to provide an improved ice cream mixture which will have a chewable or crunchy bite sensation so as to substantially reduce or eliminate the usual mushy or plastic bite.

It is also among the objects of the present invention to provide an ice cream into which may be incorporated corn flakes or other similar materials tending to become soggy, disintegrated or softened when mixed with the ice cream or ice cream mix, or when mixed with other frozen confection materials which contain relatively high amounts of moisture as for example, over 25% or 35%, and most generally over about 50% or 60%.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has been found that pure butter may be readily incorporated in ice cream by coating the butter, preferably in its molten condition, upon corn flakes, for example, at room temperature or at elevated temperature, following which, the flakes so coated are incorporated into the cold ice cream mix, preferably after congealing the butter coating on the corn flakes. The ice cream mix should generally have a temperature below the solidification point of the butter and the temperature of the ice cream upon packaging and storage should always be such as to keep the butter in rigid or solidified condition and prevent the melting or dripping off of all of the butter coating from the flakes while in the ice cream mixture.

By incorporating butter in this way in ice cream considerable advantages accrue. For example the butter is present in its fatty or normal water-in-fat emulsion form instead of being present as particles of butterfat in a fat-in-water emulsion, as it is in ice cream. When butter is present in its water-in-fat form, the butter flavor is predominant in substantially more concentrated form in view of the fact that butter in this form is immediately accessible to the sensory buds in the mouth whereas, when butter is present in ice cream, there is substantially only the taste sensation of richness when the ice cream is eaten, without having the true butter flavor present. This is due to the fact that in cream or ice cream, a very fine oil-in-water emulsion is formed and therefore, when the cream is eaten, it is generally swallowed before the emulsion is broken in the mouth.

Another advantage of this invention is that materials which normally soften or disintegrate when contacted by ice cream may now be coated with butter in accordance with the manner described, and in such coated form, with the butter forming a relatively rigid protection against the moisture of the ice cream, the crispness and other qualities of the normally disintegratable products will be substantially retained for longer periods of time.

Although corn flakes may be used in carrying out this invention, it is also possible to coat other materials such as puffed rice, puffed wheat, rice flakes, bran flakes, oat flakes (oatmeal), farina, popcorn, and other high starch containing materials, or malted milk pieces, chocolate pieces, and sugar pieces, or, in general, various materials which normally disintegrate, or melt, or become mushy, or lose their crispness, etc., when contacted, particularly for any length of time, by the water or aqueous medium of the ice cream or frozen confection mix. Generally preferred and most generally utilized are breakfast foods, most generally cereal breakfast foods, or cereal foods, or foods containing high proportions of starchy material, as, for example, over 40% to 50%, and most generally over 70% to 80% for instance.

Also, generally, these food materials for the preferred embodiment of this invention, are of a crisp, toasted, crunchy, or brittle nature. If they are not normally of this nature it is generally desirable and necessary to dry them, toast them or otherwise treat them so as to produce this desirable crisp, dry quality.

As a general rule, where these flakes or other food pieces are introduced into the ice cream, they may comprise a minor portion of the entire finished ice cream combination, as, for example, under 45% or 50% by weight of the total weight or they may preferably comprise, for example, under 25% to 40% by weight of the finished ice cream product.

Also, it is in many cases desirable that the butter not only coat the exterior surfaces of the materials that are being coated but also that it is impregnated within the open pores. This impregnation may take place in various ways as, for example, by soaking the flakes or food pieces in the molten butter (at temperatures ranging from 110° F. to 150° F., for example) and then congealing, preferably using quick chilling.

Although the butter may be applied in whatever proportions are desired, as, for example, under 50%, or even under 30% to 40% based upon the total weight of the butter coated flakes, it is most generally preferred for the proper carrying out of this invention to have the butter present in an amount exceeding, by weight, the weight of the corn flakes or similar material on which the butter is coated. Preferred proportions for example, are over 50% by weight of the butter based on the total weight of the flakes and the butter, or even ranging, for example, from 60% to 80% by weight of butter based on the total weight of the butter coated flakes. Other suggested proportions may be, for example, three, four or five times as much butter, by weight, as compared with the uncoated food flakes or food pieces. The use of butter in such major proportion as compared with the weight of the flakes on which it is coated has various advantages over the use of minor proportions of butter.

Not only may the butter coated pieces be put into the ice cream mix when the ice cream mix is sufficiently chilled to congeal the butter thereon, but it is generally preferable to chill the butter on the food pieces first, before admixture with the ice cream, so as to be assured of the rigid and congealed coating on the food material prior to admixture with the ice cream or ice cream mix.

In the carrying out of this invention, instead of using pure butter as the coating medium, an emulsion may be made with butter and other flavoring materials as, for example, molasses, honey, chocolate syrup, etc. However, where such an emulsion is used as the coating medium, it is essential that this emulsion which is used is of a water-in-fat type emulsion so that there will be substantially no water present as the exterior phase of the emulsion, so as thereby not to contact the food materials that are coated and thereby produce the disintegration of the food pieces. Such aqueous materials that may be present should be thoroughly emulsified within the butter, so that when the butter is coated on the surfaces of the food material there is substantially no moisture at all that contacts the food but substantially only the butter. Although, in some instances, such water-in-fat emulsions may be used to form a hardened surfacing or coating upon the flakes, crumbles, or granules, it is not possible to use reverse type emulsions in which the water is the continuous phase and the butter is the disperse phase.

The nutritive value of butter, its vitamin content, its melting point, and the other characteristics peculiar to butter, and particularly its quality to be transformed very quickly from a hard rigid condition as a protective and as a water and air repellent, to a relatively liquid quickly digestible condition when the chill of the ice cream is removed as the ice cream is eaten, makes butter peculiarly adaptable for this invention. Also, the presence of some moisture in butter enables it to carry small amounts of powdered or other materials for flavoring or food purposes such as powdered sugar, malt, chocolate, powdered skim milk, powdered whey, etc., which materials will be included in the butter or butter emulsion and which may be more or less dissolved in the water that is present.

Although butter is peculiarly adapted for the carrying out of this invention, there may be used in lieu of the butter, other materials such as, for example, cocoa butter, cocoanut oil, etc., particularly when these materials are of a low melting point as, for example, between about 70° F. and 100° F. or 110° F. Of course, these materials produce different results as compared with butter. In some cases these materials, or other materials such as palm kernel stearin of 110° F. to 115° F. melting point, for instance, may be mixed in generally small or required proportions with the butter so as to produce the characteristics of increased hardness, if desired. Further, various liquid oils such as olive oil, sesame oil, or cod liver oil, for example, may be used, if desired, to mix with these materials or even with the butter, but the final combined fat must be such that it will be solidified, congealed or rigidified at the frozen temperature of the ice cream or other frozen confection. Wherever possible, the fat that is used in lieu of butter should be of such character, or should be adjusted or modified so as to resemble butter in the various necessary characteristics.

It is particularly desirable and one of the principal purposes of this invention to utilize butter or a butter like material which, while it is rigid, solid, or congealed at the frozen temperature of the ice cream so as to protect and coat the crisp or dry material which is subject to softening or deterioration when in contact with the moisture of the ice cream, is nevertheless of a quality or of a sufficiently low melting point that it will melt at body temperature so as to result in quick digestibility. There is thereby produced a novel combination in which the butter forms a substantially hard coating in a manner usually produced by a high melting point fat, but which butter, in the carrying out of this invention, is, to the contrary, of a relatively low melting point.

Although ice cream is one of the most preferred frozen confections to use in carrying out this invention, it is also possible to use other frozen confections such as sherbets, custards, or ices.

A particular advantage of the product of the present invention is that there may now be produced for children, for example, a combination of corn flakes and milk, or a combination of corn flakes and cream, or a combination of other cereal foods with milk or cream, for instance, except that the combined cereal and milk, or cereal and cream is now in a more edible form or in an entirely new form, in that the milk or cream is in a chilled or frozen condition. In this form this cereal combination may be eaten in its frozen condition or, if desired, it may be placed in a bowl and the milk or cream allowed to melt so as to produce a cereal and cream combination without the cereal having been substantially deteriorated by its contact over relatively long periods of time with the moisture of the milk or cream.

If desired, this cereal and milk, or cereal and cream combination may be modified by including therein, if desired, various flavoring materials, or sugar, or stabilizing materials such as gelatin, casein, vegetable gums, etc., or the milk or cream may be utilized in its natural condition. Also, it is possible in a combination of this kind to include, if desired, various food elements for child feeding as, for instance, dextri-maltose, vitamin materials, powdered vegetable materials, etc. It is generally preferable to include materials such as these in the butter coating that is used for the cereal pieces so that this butter will protect these usually powdered or pulverized food elements from coming into direct contact with the moisture that is present in the milk or cream.

The butter that is used in the carrying out of this invention may be salt butter or sweet creamery butter, etc., and it may be mixed with various flavoring materials as desired. The butter may be coated on the flakes or other food pieces in either thin layers or in the form of substantially thicker layers, as desired. It is generally preferred to have the butter coated on the food pieces in as uniform a coating as possible, and the coated food flakes distributed throughout the ice cream mass so as to result in a substantially uniform final product with the butter substantially uniformly distributed throughout. Further, it is generally preferred to have the butter coated in as thick a coating as possible on the flakes, commensurate with the amount of fat it is desired to use, because, when the butter is coated in thicker layers, there is the tendency to get more butter flavor when the ice cream mixture is eaten, due to the fact that the butter, in this thicker form, will not so readily emulsify in the mouth with the cream.

This invention has a particular advantage when the butter is coated on high starch containing materials such as corn flakes, etc. In such cases the starchy or cereal nature of the corn flakes, etc., tends to minimize the fattiness of the butter. This is particularly realized when substantially thicker layers of butter are used. By resulting in this counteraction of the starchiness of the cereal products with the fattiness of the butter, even larger amounts of butter may be utilized in the carrying out of this invention without obtaining any unpleasant fattiness, and the butter at the same time will be retained in its original butter condition without becoming part of the fat-in-water emulsion of the ice cream itself.

In the preparing of the product of this invention, it is desired to have the corn flakes or other food pieces in a separated condition rather than having them bound together by the congealed butter. An advantage of this separated formation is that, when the ice cream is eaten in the form of "ice cream on a stick," for example, or when the ice cream is cut in brick form, the ice cream may be eaten or cut evenly without affecting other interior portions of the ice cream. This would not be the case if the food pieces were in the form of a rigidly bound structure, in which case the breaking of part of the structure by biting or cutting would obviously tend to break or effect other portions of the structure, with resultant disadvantages. The structure of the flakes in this particular invention is one in which the butter coated flakes or food pieces are bound together by the ice cream into a more flexible ice cream unit rather than into a more rigid or inflexible ice cream unit.

In some cases, good results have been had in the carrying out of this invention by coating the frozen strawberries and other frozen fruits used in the making of an ice cream with substantially heavy coatings of butter and then mixing these butter coated fruits into the ice cream mix. In cases such as this and also in other cases where it is desired to place thick layers of butter on the food pieces, this is generally accomplished by dipping the food pieces in molten butter, allowing the butter to congeal, and then repeating the dipping process as many times as required, into butter, particularly being careful that the butter is not applied at too high a temperature so that the previous layers are melted away from the food piece.

A number of further advantages accrue from the use of butter in its free natural condition in the ice cream mixture, as contrasted with its presence in the form of butterfat, as a component of the ice cream itself. For example, because of the frequently harsh effect of the chill of ice cream on the mucous membranes of the stomach and digestive tract, it is of real value to have the butter present in free state so that as it quickly or abruptly melts from the flakes on which it is coated, there is a tendency for this butter to coat these mucous membranes and protect them at least to some extent from the chill of the ice cream. When this butterfat is present in the ice cream, even in larger amounts, the fineness of the emulsion is such that it takes considerable time before the butter is released from the cream and, in the meantime, the continuous phase of the cream emulsion, namely, the aqueous portion, which is the portion that is chilled and frozen, contacts the mucous membranes and results in the harshness that is produced.

Further, a surprisingly more concentrated butter flavor is obtained in ice cream where the butter is utilized in accord with this invention and therefore, instead of making an ice cream with a 20% butterfat, for example, the ice cream may be made to contain a 10% butterfat, with the remaining 10% being incorporated in the ice cream in the form of natural butter, coated on the food pieces, with these butter coated food pieces then being mixed with the ice cream in the manner described. The resultant product consisting of 10% butterfat ice cream and the remaining 10% coated on the food flakes, will have a substantially improved butter flavor than the ice cream containing a 20% butterfat in the ice cream mix itself. The butter flavor is thereby more intensified in the new product instead of being relatively lost, or diffused, in the oil-in-water emulsion of the cream.

*Example I*

Melt 100 grams of unsalted butter, and bring the temperature of this melted butter to 110° F. While the butter is at this temperature immediately add 100 grams of crisp corn flakes which have previously been heated, if necessary, to crispen them. Mix together well the corn flakes with the melted butter so that there is a complete coverage of all of the corn flakes with the melted butter. This combination is then placed into a cool room or into a quick chill room so as to congeal the butter on the corn flakes and so as to retain a complete coverage of the butter on the flake pieces before this butter has too much of a chance to drain off.

Preferably, when the butter coated corn flakes are placed into the cool room they should be spread in relatively flat layers and the corn flakes should be, as far as practicable, in a relatively separated condition so that there will not be masses of the corn flakes bound together by the congealed butter.

The corn flakes which are now coated with the congealed butter are mixed with the ice cream mix just after the mix has been whipped and chilled and just before the chilled mix is placed in the hardening room to harden. Care should be taken in mixing the corn flakes with the ice cream mix, to crumble the corn flakes as little as possible.

This cold ice cream and cereal combination is then hardened in the usual way used for ice cream, and it may then be sold in bulk, or packaged and sold in brick form, or, it may be utilized in the form of ice cream on a stick. In any of these cases there will be produced an entirely new and novel type of ice cream combination including crisp cereal flakes along with the ice cream.

In this particular example 100 grams of ice cream mix was combined with 50 grams of the butter coated corn flakes to produce the finished ice cream combination. Various types of product may be made by varying the quantity of the materials that are combined together. For example, 25 grams of the butter coated corn flakes are combined with 100 grams of the ice cream mix, and also, in order to produce a higher ice cream product, 25 grams of the butter coated corn flakes may be combined with 300 grams of the ice cream mix.

*Example II*

There is mixed together 100 grams of the small food pieces commercially known as "Grape-nuts" (consisting apparently of a combination of malt, barley, yeast and sugar) and 80 grams of 98° F. melting point cocoanut oil. The cocoanut oil, prior to the mixing with the "Grape-nuts" is melted to a temperature of 120° F.

These fat coated "Grape-nut" pieces are then immediately placed into trays and are spread as flat as possible. They are then immediately placed into a cold room at a temperature of 40° F. When the fat has congealed on the "Grape-nuts," this material is then shaken or broken up so as to separate the grape-nut pieces from each other as much as possible, being careful however not to break the fat coating from around the "Grape-nut" pieces. If desired, these pieces may be shaken while the fat is being congealed, so as to keep the particles substantially separated.

Immediately thereafter these pieces are removed from the cold room and each 100 grams is mixed with 300 grams of a combination of milk and cream, so adjusted that the fat content is about 15%. This milk-cream and "Grape-nuts" combination is then frozen and packed as desired. For use, this combination may either be eaten in its frozen condition, or preferably, this combination may be placed into a bowl and allowed to melt, in which form it may be eaten in the same way as usual cereal breakfast food and milk are eaten.

The present application is a continuation in part of application Serial No. 282,342, filed July 1, 1939, which application matured into Patent No. 2,217,700, issued October 15, 1940.

What I claim is:

1. An ice cream mixture comprising crisp corn flakes coated with a layer of rigidified hardened butter, said butter coated corn flakes being distributed throughout the mass of the frozen ice cream, and said corn flakes being relatively unattached from each other.

2. A frozen confection having distributed throughout its mass a plurality of particles of a food material normally tending to become softened or melted when contacted by the water of the frozen confection, said distributed food particles being surfaced with butter, said food particles being substantially protected by the butter coating from the water of the frozen confection, and said food particles being relatively unattached from each other.

3. A frozen confection having distributed throughout its mass a plurality of particles of a food material normally tending to become softened or melted when contacted by the water of the frozen confection, said distributed food particles being surfaced with an edible fatty material that is rigid at the temperature of the frozen confection said fatty material being of a quality that will nevertheless melt and be digestible at body temperature, said food particles being substantially protected by the fat coating from the water of the frozen confection, and said food particles being relatively unattached from each other.

4. A process of making a crunchy ice cream preparation, said process comprising mixing corn flakes with molten butter, then introducing the buttered flakes into a liquid ice cream mix having a temperature below the melting point of the butter, and then freezing the ice cream mix so as to retain the butter coating of the corn flakes in this rigidified condition on the flakes.

5. The method of making a frozen confection which contains therein a food material normally susceptible to becoming softened or melted when contacted by the water of the frozen confection, but which food material is now protected against the deteriorative action of the water, said process comprising coating a molten fat on a food piece normally subject to becoming deteriorated when coming in contact with water, then congealing the fat on the food piece, then mixing the fat coated food piece with the confection material and thereafter chilling the confection so as to retain the fat coating on the food pieces at a temperature below the melting point of the fat.

ALBERT MUSHER.